United States Patent
Kitamura

(10) Patent No.: US 7,589,449 B2
(45) Date of Patent: Sep. 15, 2009

(54) ELECTRIC ROTATING MACHINE

(75) Inventor: Yutaka Kitamura, Tokyo (JP)

(73) Assignee: Mitsubishi Denki Kabushiki Kasiha, Tokyo (JP)

( * ) Notice: Subject to any disclaimer, the term of this patent is extended or adjusted under 35 U.S.C. 154(b) by 421 days.

(21) Appl. No.: 11/431,609

(22) Filed: May 11, 2006

(65) Prior Publication Data

US 2006/0284580 A1    Dec. 21, 2006

(30) Foreign Application Priority Data

May 13, 2005    (JP)    ............................ 2005-140458

(51) Int. Cl.
  *H02K 1/22*    (2006.01)
  *H02K 1/24*    (2006.01)
(52) U.S. Cl. ............. 310/263; 310/156.16; 310/156.17; 310/156.66
(58) Field of Classification Search ............... 310/68 R, 310/156.08, 156.16, 156.17, 156.66–156.72, 310/263
See application file for complete search history.

(56) References Cited

U.S. PATENT DOCUMENTS

| | | | | |
|---|---|---|---|---|
| 4,720,647 A | * | 1/1988 | Plumer | ........................ 310/77 |
| 5,780,953 A | * | 7/1998 | Umeda et al. | ................ 310/263 |
| 6,246,131 B1 | * | 6/2001 | Sheng | .......................... 310/12 |
| 2006/0186754 A1 | * | 8/2006 | Kitamura et al. | ............. 310/263 |

FOREIGN PATENT DOCUMENTS

| | | | |
|---|---|---|---|
| FR | 2536603 A1 | * | 5/1984 |
| JP | 3265451 A | | 11/1991 |
| JP | 993846 | | 4/1997 |
| JP | 10004661 A | | 6/1998 |
| JP | 2865091 | | 12/1998 |
| JP | 2865091 B2 | | 12/1998 |
| JP | 1141887 | | 2/1999 |
| JP | 11355988 | | 12/1999 |
| JP | 3063106 B2 | | 12/2000 |
| JP | 2001275326 A | * | 10/2001 |
| JP | 2001359263 A | * | 12/2001 |
| JP | 2003225000 | | 8/2003 |

* cited by examiner

*Primary Examiner*—Tran N Nguyen
(74) *Attorney, Agent, or Firm*—Sughrue Mion, PLLC

(57) ABSTRACT

The electric rotating machine includes a rotor and an armature. The rotor consists of a cylindrical part having a field winding and a claw-pole shaped magnetic pole part. A magnetic short-circuit mechanism is disposed between the magnetic pole parts adjacent each other in circumferential direction of a rotor core so as to cause a magnetic plate of a material of high magnetic permeability to move toward radial direction of the rotor core, thereby short-circuiting between N-pole and S-pole of a permanent magnet due to centrifugal force acting in accordance with rotation of the rotor.

11 Claims, 13 Drawing Sheets

ELECTRIC ROTATING MACHINE

BACKGROUND OF THE INVENTION

1. Field of the invention

The present invention relates to an electric rotating machine in which a rotor is provided with a permanent magnet that supplies magnetic flux to an armature core in cooperation with a field winding.

2. Description of the Related Art

In charging generators for use in vehicles, for example, it is a recent trend that higher power, downsizing and weight saving have been increasingly demanded in order to improve current consumer and fuel economy required by the vehicles. To meet this demand, an attempt has been proposed to reduce leakage flux between magnetic poles, increase effective magnetic flux and improve power output by adding magnetizing force with a permanent magnet to magnetic field of a generator, as disclosed in the Japanese Patent Publication No. 2865091.

In the generator of such arrangement, however, even if the power is generated only with the permanent magnet without using field current, power generation level comes to exceed an electric load when the generator is rotated at high speed under the small electric load. As a result, there is a disadvantage of breakage of battery due to overcharge or application of abnormal voltage to the electric load.

To overcome this disadvantage, one of prior arts employs an arrangement consisting of at least two types of rotors, that is, a first rotor provided with a field winding and a second rotor provided with a permanent magnet, and switching means for changing a value of field current flowing through the mentioned field winding and changing a direction of flow, as disclosed in the Japanese Patent Publication No. 3063106. In such a prior art, when the electric load is large, the current value and flowing direction are controlled by the switching means so that a predetermined magnetic flux is generated with respect to the field winding in the same direction as the permanent magnet. On the other hand, when the load is small and magnetic flux from the permanent magnet is sufficient for the power output, the current value and flowing direction are controlled by the switching means so that the magnetic flux generated by the permanent magnet is cancelled by the magnetic flux generated in the field winding. Thus, the output voltage is adjusted to be a suitable value, resulting in prevention from over-voltage.

In the technology disclosed by the above-mentioned Japanese Patent Publication No. 3063106, however, a problem exists in that it is necessary to be provided with at least two types of rotors of a first rotor provided with a field winding and a second rotor provided with a permanent magnet, the arrangement becomes complicated as a whole, which results in increase of weight and cost.

Another problem exists in that it is necessary to separately add the switching means for changing a value of field current flowing through the mentioned field winding and changing a direction of flow depending on the magnitude of electric load, which also results in increase of cost.

Moreover, a further problem exists in that when the rotor is driven at high speed and electric load is small, it is necessary to continuously cause current to flow in a direction of reducing the magnetic flux generated by the permanent magnet for the purpose of suppressing generation of over-voltage, eventually resulting in increase of power consumption.

SUMMARY OF THE INVENTION

The present invention was made to solve the above-described problems and has an object of providing a small type and high power electric rotating machine of a relatively simple construction at a reasonable cost, the electric rotating machine being capable of increasing power generation in lower or medium speed rotation range while effectively preventing the generation of over-voltage in high speed rotation range without inviting any excessive cost increase.

To accomplish the foregoing object, an electric rotating machine according to the invention includes an armature formed by winding an armature winding on an armature core, and a rotor rotatably supported on the inner diameter side of the mentioned armature with a predetermined space. The mentioned rotor includes a rotor core consisting of a cylindrical part on the outer periphery of which a field winding is wound, and a claw-pole shaped magnetic pole part that is magnetized so that magnetic poles adjacent each other in circumferential direction are different in pole. A permanent magnet for supplying magnetic flux to the mentioned armature core in cooperation with the mentioned field winding is disposed in the mentioned magnetic pole part. This electric rotating machine employs a following characteristic arrangement:

That is, in the electric rotating machine according to the invention, a magnetic short-circuit mechanism is disposed between the magnetic pole parts adjacent each other in circumferential direction of the mentioned rotor core. This magnetic short-circuit mechanism causes a magnetic plate composed of a material of high magnetic permeability to move toward radial direction of the mentioned rotor core so as to short circuit between N-pole and S-pole of the mentioned permanent magnet due to centrifugal force acting in accordance with the rotation of the mentioned rotor.

In the electric rotating machine of above construction, in the low or medium speed rotation range, the magnetic plate of the magnetic short-circuit mechanism is separated from the permanent magnet, so that effective magnetic flux is increased due to the magnetic flux generated by the permanent magnet and magnetic flux generated from the magnetic field of the field winding, thereby power generation being increased. On the other hand, in the high speed rotation range, the magnetic plate comes in contact with the permanent magnet due to centrifugal force to short-circuit between short circuit between N-pole and S-pole of the mentioned permanent magnet, the magnetic flux supplied from the permanent magnet to the armature core is reduced, thus generation of over-voltage at the time of small load and high speed rotation being effectively prevented.

Accordingly, it becomes possible to mount any permanent magnet of large magnetizing force, thereby improving largely power generation output characteristic or torque characteristic. Furthermore, since the magnetic short-circuit mechanism is operated utilizing the centrifugal force generated by the rotation of the rotor, it is no necessary to dispose any switching means for changing a value of field current flowing through the mentioned field winding and switching a direction of flow as is done in the prior arts. As a result, it becomes possible to obtain a small type and high power electric rotating machine of a relatively simple construction at a reasonable cost.

The foregoing and other objects, features, aspects and advantages of the present invention will become more apparent from the following detailed description of the present invention when taken in conjunction with the accompanying drawings.

BEST MODE FOR CARRYING OUT THE INVENTION

Embodiment 1

Figure 1:
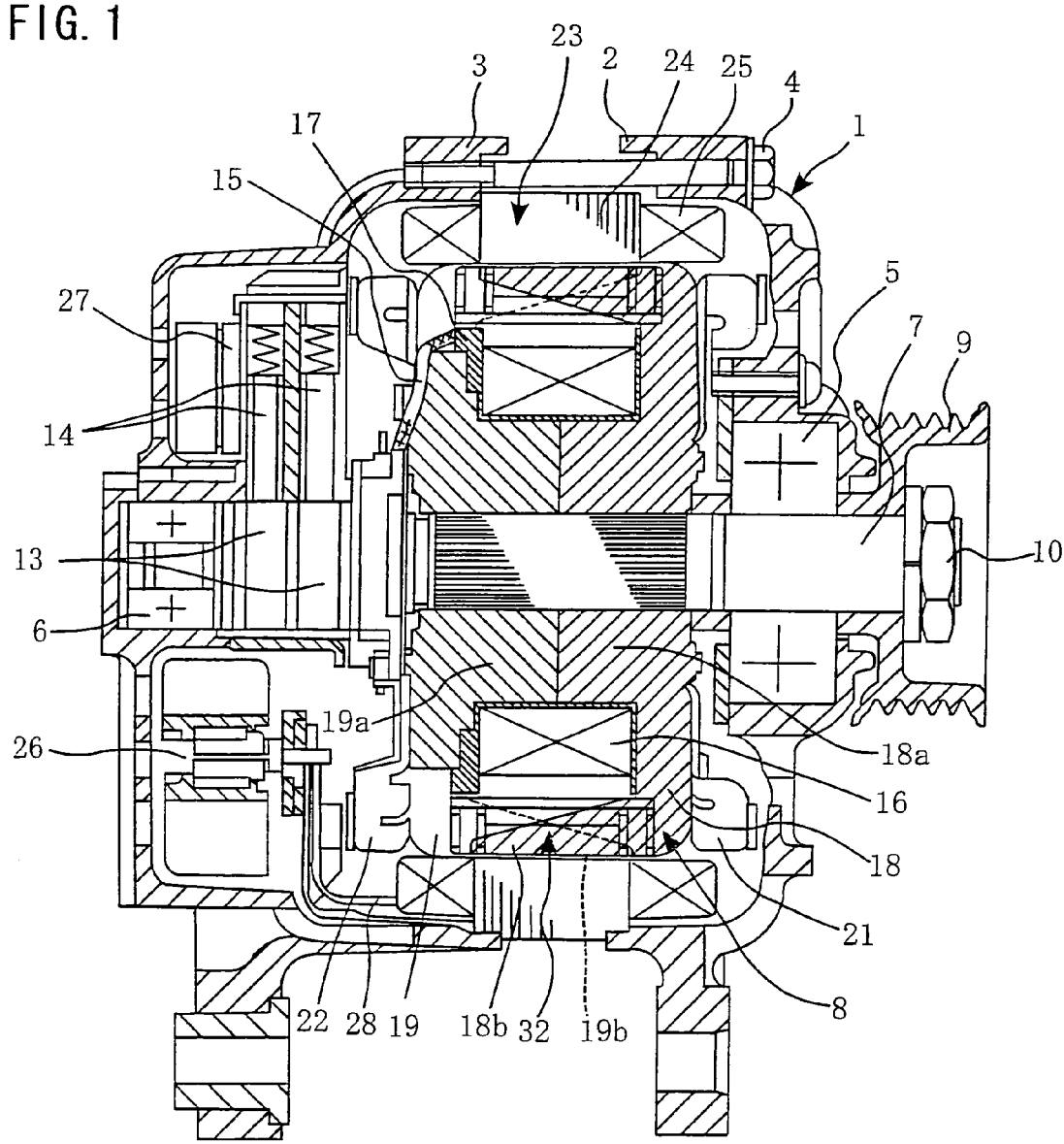
FIG. 1 is a cross sectional view showing a construction of an electric rotating machine functioning as a charging generator according to Embodiment 1 of the present invention.
Figure 2:
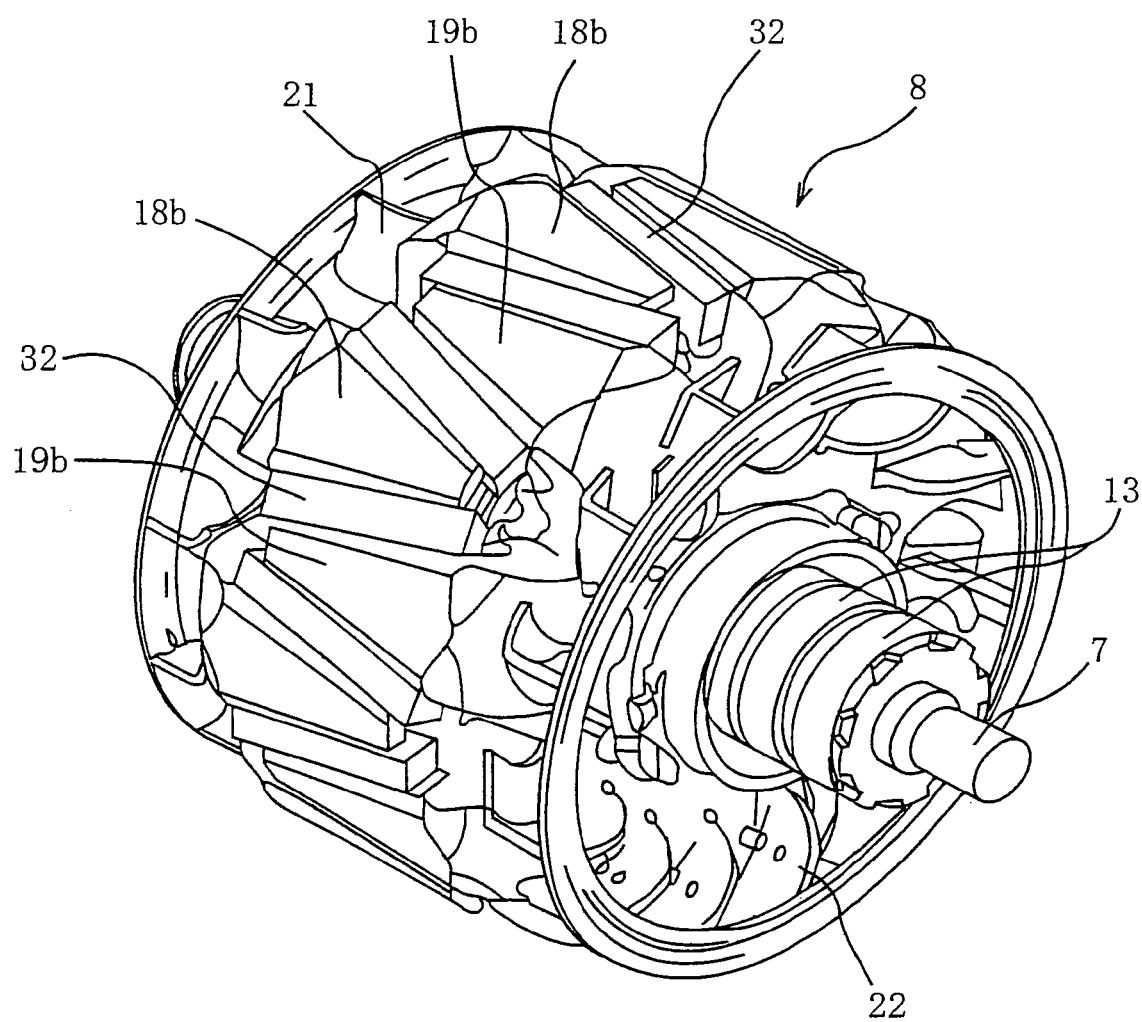
FIG. 2 is a perspective view showing in detail a construction of a rotor of the electric rotating machine of FIG. 1.
Figure 3:
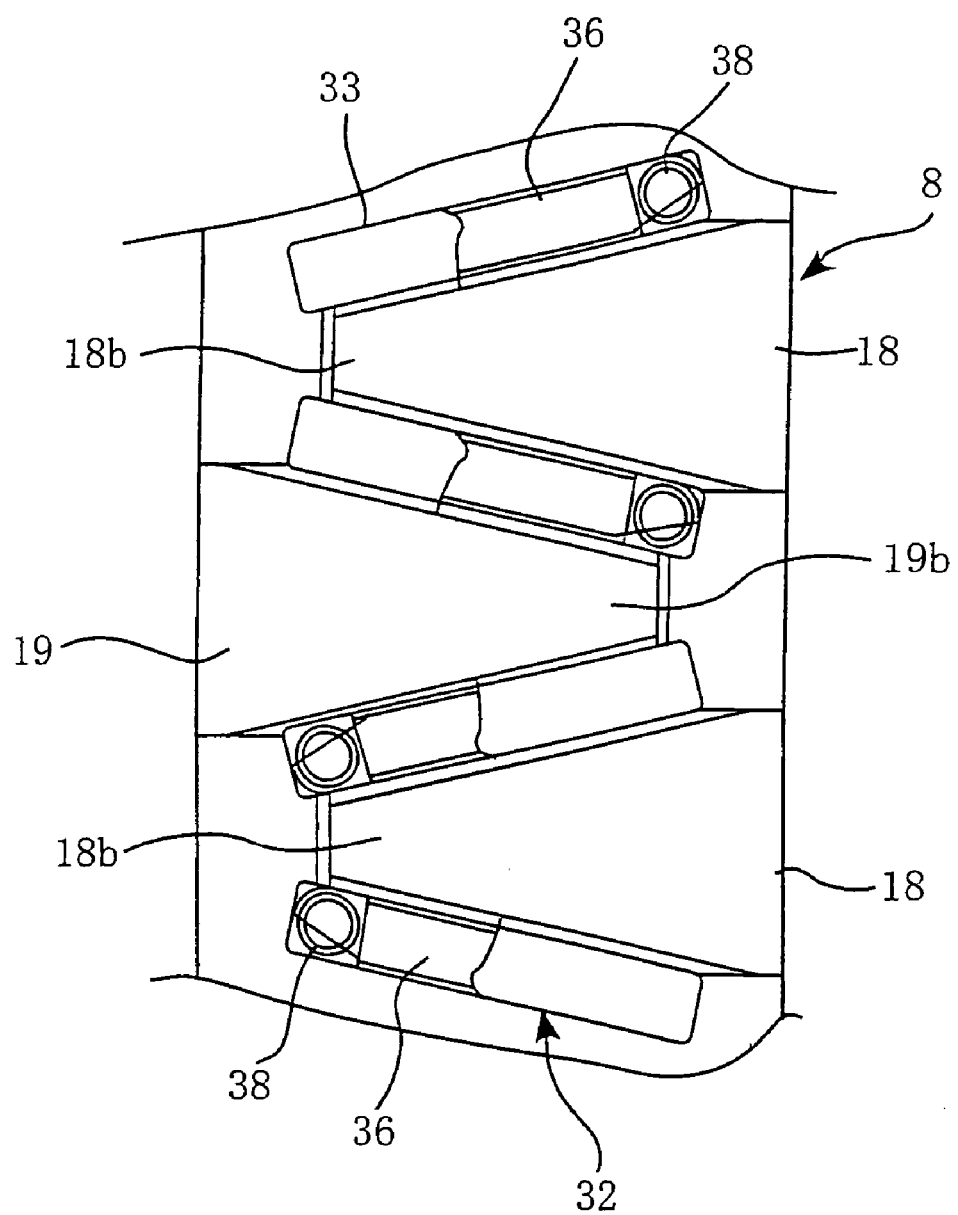
FIG. 3 is a plan view showing a part of the rotor of the electric rotating machine of FIG. 1 taken from above.
Figure 4A:
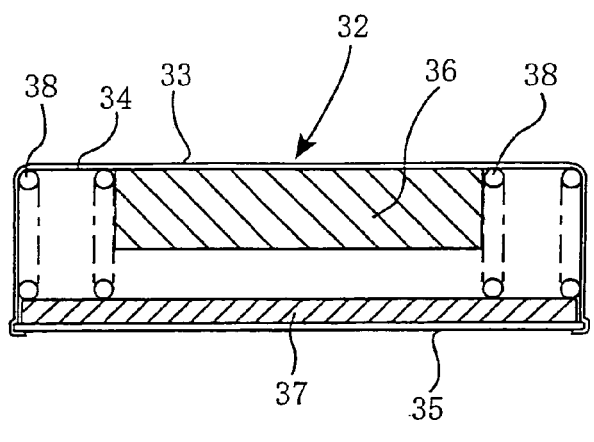
FIGS. 4A and 4B are cross sectional views of a magnetic short-circuit mechanism with which the rotor according to Embodiment 1 is provided, and respectively show a state that a magnetic plate is separated from a permanent magnet by spring force of a coil spring.
Figure 4B:
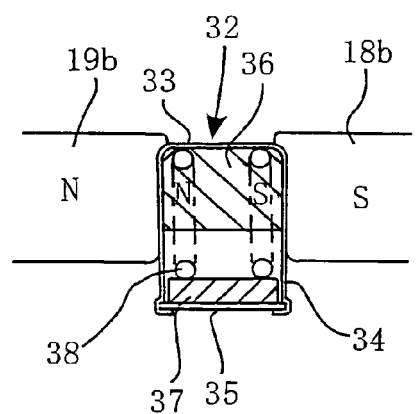

FIG. 1 is a cross sectional view showing a construction of an electric rotating machine according to Embodiment 1 of the present invention; FIG. 2 is a perspective view showing in detail a construction of a rotor of the mentioned electric rotating machine; FIG. 3 is a plain view showing a part of the rotor of the mentioned electric rotating machine taken from above; and FIGS. 4A and 4B are cross sectional views of a magnetic short-circuit mechanism with which the mentioned rotor is provided.

The electric rotating machine according to this Embodiment 1 functions as a charging generator, and includes a case 1. A front bracket 2 and a rear bracket 3 are integrally formed into one component with a bolt 4, thus forming the case 1. In this case 1, a rotary shaft 7 is rotatably supported by left and right bearings 5, 6, and a claw-pole type rotor 8 is fixed to the rotary shaft 7.

Further, a pulley 9 around which a timing belt driven by an engine not shown is wrapped is fixed to one end of the rotary shaft 7 with a nut 10, and a slip ring 13 is fitted to the other end. A pair of brushes 14 slides and comes in contact with the slip ring 13. The slip ring 13 is electrically connected to a later-described field winding 16 of the rotor 8 via a wire 15. In this manner, field current is supplied to the field winding 16.

The rotor 8 is provided with the field winding 16 that generates magnetic flux and a bobbin 17 around which the field winding 16 is wound. Further, the rotor 8 is provided with a pair of rotor cores 18, 19 in which magnetic poles are formed by the magnetic flux from the field winding 16 so as to cover the magnetic field 16. Cooling fans 21, 22 are fixed on each side of the rotor cores 18, 19.

An armature 23 fixed to an inner circumference of the case 1 is disposed concentrically on a radial outside of the rotor 8. The armature 23 consists of an armature core 24 through which rotating magnetic field by the rotor 8 passes, and an armature winding 25 wound around the armature core 24.

A rectifier 26 for rectifying output current of the armature 23 and a voltage control unit 27 functioning as voltage control means that controls output voltage of the armature 23 are disposed in the case 1 on the side of the rear bracket 3. The rectifier 26 is electrically connected to the armature winding 25 via a wire 28, and the rectifier 26 is electrically connected to the voltage control unit 27 in the same manner.

The each rotor core 18, 19 forming the rotor 8 includes cylinder parts 18a, 19a and claw-shaped pole parts 18b, 19b. The field winding 16 and the bobbin 17 are accommodated in an outer circumferential part of the cylinder parts 18a and 19a. Each of the magnetic pole parts 18b, 19b is formed by a required number of pole, and intersects alternately so as to cover the outer diameter side of the field winding 16. The magnetic pole parts 18b, 19b adjacent each other are arrayed at a constant pitch with a predetermined distance in circumferential direction. The claw-pole shaped magnetic pole parts 18b, 19b are magnetized so that magnetic poles adjacent each other in circumferential direction are different in pole A magnetic short-circuit mechanism 32 incorporating therein a later-described permanent magnet 36 is disposed between the magnetic pole parts 18b, 19b adjacent each other.

This magnetic short-circuit mechanism 32 reduces leakage flux between the magnetic pole parts 18b, 19b by the permanent magnet 36, and magnetically short-circuits N-pole and S-pole of the permanent magnet 36 in accordance with the number of revolution of the rotor 8. The magnetic short-circuit mechanism 32 is hereinafter described in detail.

As shown in FIG. 4, the magnetic short-circuit mechanism 32 is provided with a non-magnetic case 33 composed of stainless steel or the like. This case 33 consists of a case body 34 of inverted U-shape in section, and a tap plate 35 that closes liquid-tight an opening on the underside of the case body 34. The permanent magnet 36, magnetic plate 37 of high magnetic permeability composed of stainless steel or the like, and a pair of coil springs 38 functioning as spring member for pressing the magnetic plate 37 by expansion and contraction in radial direction of the rotor 8 are accommodated in the case 33.

Further, sides of the permanent magnet 36 facing the magnetic pole parts 18b, 19b are polarized to be N-pole and S-pole so as to be coincident to polarities (N-pole, S-pole) of the magnetic pole parts 18b, 19b adjacent each other. As shown in FIGS. 4A and 4B, in the case where the rotor 8 is in resting state or driven at low speed, the magnetic plate 37 is held in a state of being separated from the permanent magnet 36 by a predetermined distance due to the spring force of the coil spring 38.

Consequently, since the magnetic short-circuit mechanism 32 is formed only of the case 33, permanent magnet 36, magnetic plate 38 and coil spring 38, the whole structure of the mechanism 32 is simplified. Further, since the magnetic short-circuit mechanism 32 is formed into a unit independently of the rotor cores 18, 19, it becomes possible to efficiently assemble the rotor 8. Furthermore, since the magnetic short-circuit mechanism 32 is interposed between the rotor cores 18 and 19 adjacent each other, it is possible to secure easily a mounting space for mounting the magnetic short-circuit mechanism 32.

Additionally, the coil spring 38 is preferably composed of non-magnetic material such as stainless steel not to be affected by magnetic flux from the permanent magnet 36. Further, when employing the structure in which the case 33 is fluid-tight, it becomes possible to prevent intrusion of salt water, mud water, dust from outside. As a result, the permanent magnet 36, magnetic plate 37, coil spring 38, etc. are prevented from rust and malfunction. It is particularly more preferable that grease or the like is sealed in the case 33 for the purpose of lubrication and rust preventive.

Figure 5A:
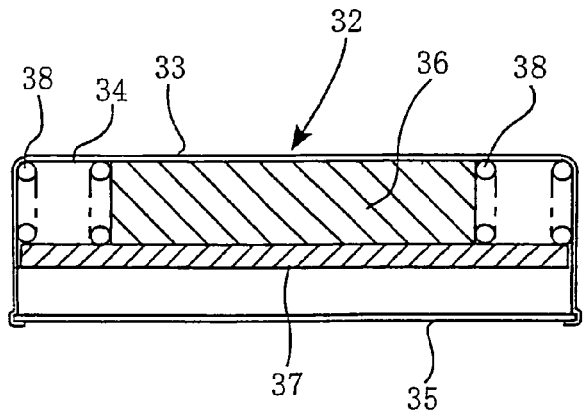
FIGS. 5A and 5B are cross sectional views showing a magnetic short-circuit mechanism according to Embodiment 1, and respectively show a state that the magnetic plate is pressed onto the inner circumferential face of the permanent magnet against the spring force of the coil spring.
Figure 5B:
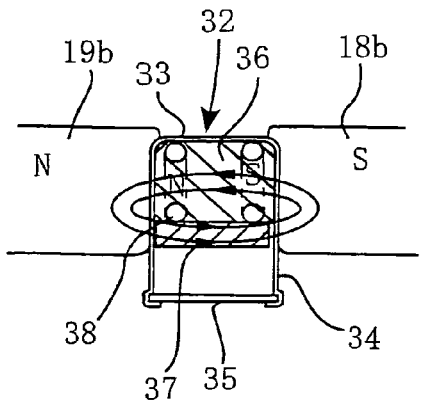
Figure 6:
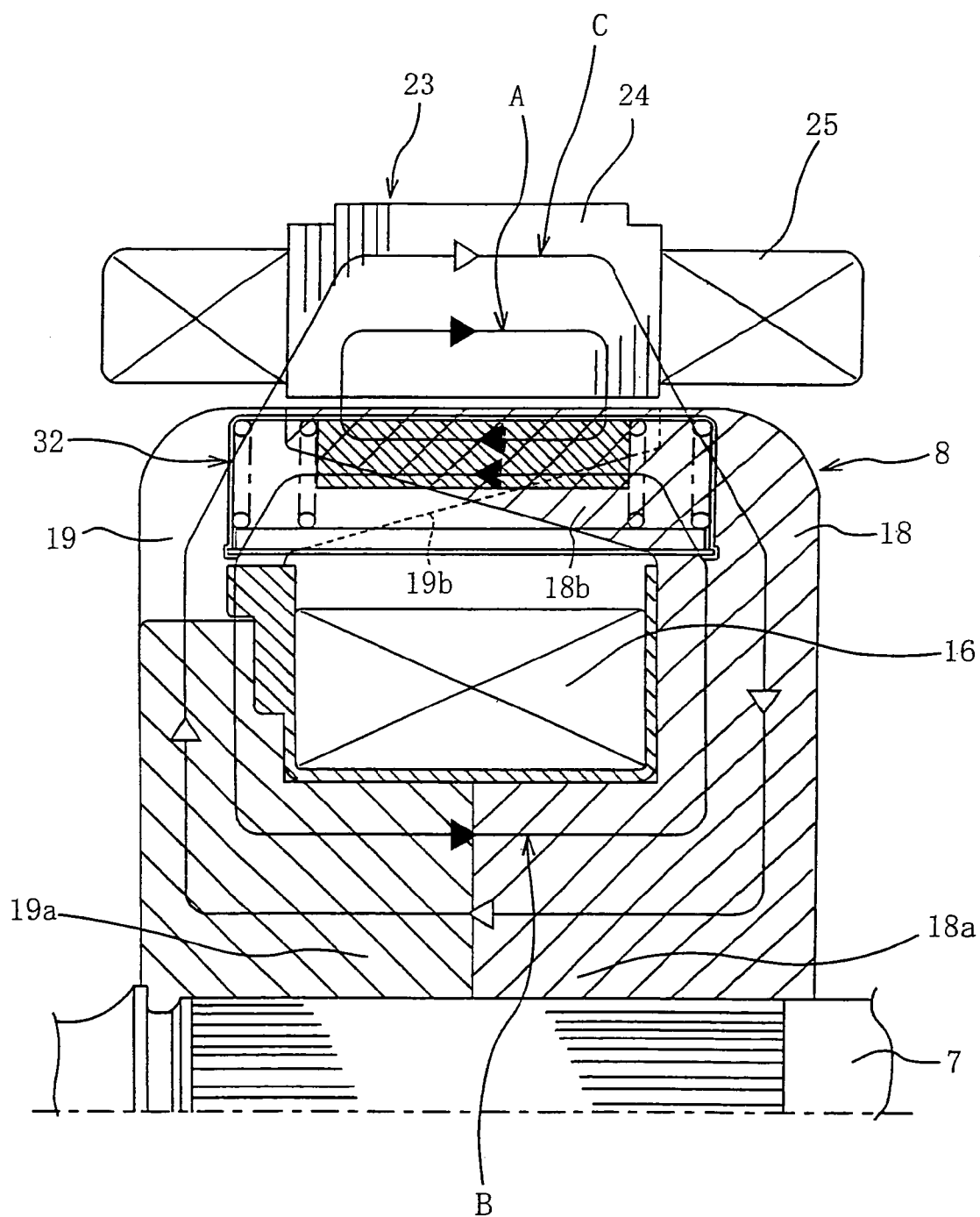
FIG. 6 is a schematic view showing direction of flow of magnetic flux generated by the permanent magnet and field winding according to Embodiment 1.

With reference to FIGS. 4, 5 and 6, operations of the electric rotating machine of above construction as a charging generator are hereinafter described. In addition, FIG. 6 is a schematic view showing direction of flow of magnetic flux generated by the permanent magnet 36 and field winding 16 in the state that the magnetic plate is not operated and there is no short-circuit between N-pole and S-pole of the permanent magnet 36.

When the rotor 8 is rotated at medium or low speed, centrifugal force is not so large. Accordingly, as shown in FIGS. 4A and 4B, the magnetic plate 37 of the magnetic short-circuit mechanism 32 is kept in the state of being separated by a predetermined space from the permanent magnet 36 due to spring force of the coil spring 38. At this time, because of the air layer existing between the magnetic pole parts 18b, 19b of the permanent magnet 36, magnetic resistance is large.

In such a state, there is less leakage flux between the magnetic pole parts 18b, 19b adjacent each other. Thus, as shown by the arrow A in FIG. 6, a flow is formed in order of N-pole of the permanent magnet 36→magnetic pole part (N-pole) 19b→space→armature core 24→space→magnetic pole part (S-pole) 18b→S-pole of the permanent magnet 36→N-pole of the permanent magnet 36.

Further, as shown by the arrow B in FIG. 6, a flow of magnetic flow B is formed in order of N-pole of the permanent magnet 36→magnetic pole part (N-pole) 19b→cylinder part 19a→cylinder part 19b→S-pole of the permanent magnet 36→N-pole of the permanent magnet 36.

Furthermore, as shown by the arrow C in FIG. 6, a flow of main magnetic flux is formed in order of magnetic pole part (N-pole) 19b→space→armature core 24→space→magnetic pole part (S-pole) 18b→S-pole of the permanent magnet 36→cylinder part 18a→cylinder part 18b→N-pole of the permanent magnet 36.

Consequently, total effective magnetic flux passing through the armature core 24 is calculated by adding the magnetic flux A generated by the permanent magnet 36 and main magnetic flux C generated by the field winding. This effective magnetic flux is larger than only the main magnetic flux C generated by the field winding 16.

Then, when the centrifugal force comes to be larger with increase of revolution speed of the rotor 8, as shown in FIG. 5, the magnetic plate 37 moves outwardly in radial direction of the rotor 8 against the spring force of the coil spring 38. When the rotor 8 rotates at a high speed larger than a first predetermined rotating speed N1, the magnetic plate 37 is pressed onto an inner circumferential face of the permanent magnet 36, thereby the N-pole and the S-pole of the permanent magnet 36 coming to be in magnetically short-circuit state through the magnetic plate 37 (see FIG. 5B). As a result, the magnetic flux A shown by the arrow A in FIG. 6 decreases.

Consequently, since the centrifugal force comes to be smaller with decrease of the revolution speed of the rotor 8, when the revolution speed of the rotor 8 decreases to a speed not more than a predetermined rotating speed N2, the magnetic plate 37 is brought back to an original position of being separated by the predetermined space from the permanent magnet 36, as shown in FIG. 4, due to spring force of the coil spring 38.

As described above, according to the charging generator of Embodiment 1 of this invention, even when the permanent magnet 36 with large magnetizing force is mounted, at the time of high-speed revolution of the rotor 8, the magnetic short-circuit mechanism 32 operates to short-circuit between N-pole and S-pole of the permanent magnet 36, thereby reducing magnetic flux A passing through the armature core 24 generated by the magnetizing force of the permanent magnet 36. As a result, generation of over-voltage at the time of small load and high-speed rotation is effectively prevented.

Further, since it is possible to mount any permanent magnet 36 of large magnetizing force without generation of over-voltage as described above, at the time of low or medium speed rotation without operation of the magnetic short-circuit mechanism 32, the magnetic flux generated by the magnetizing force of the permanent magnet 36 increases effective magnetic flux passing through the armature core 24, thereby achieving substantial increase in power generation output.

Furthermore, since the magnetic short-circuit mechanism 32 is operated utilizing the centrifugal force generated by the rotation of the rotor 8 thereby short-circuiting between N-pole and S-pole of the permanent magnet 36, it is possible to prevent generation of over-current at the time of high speed rotation effectively. Accordingly, it is no necessary to dispose any switching means for changing a value of field current flowing through the mentioned field winding and switching a direction of flow as is done in the prior arts. As a result, it becomes possible to design field windings and their accessories easily, thereby enabling to reduce manufacturing cost.

Figure 7:
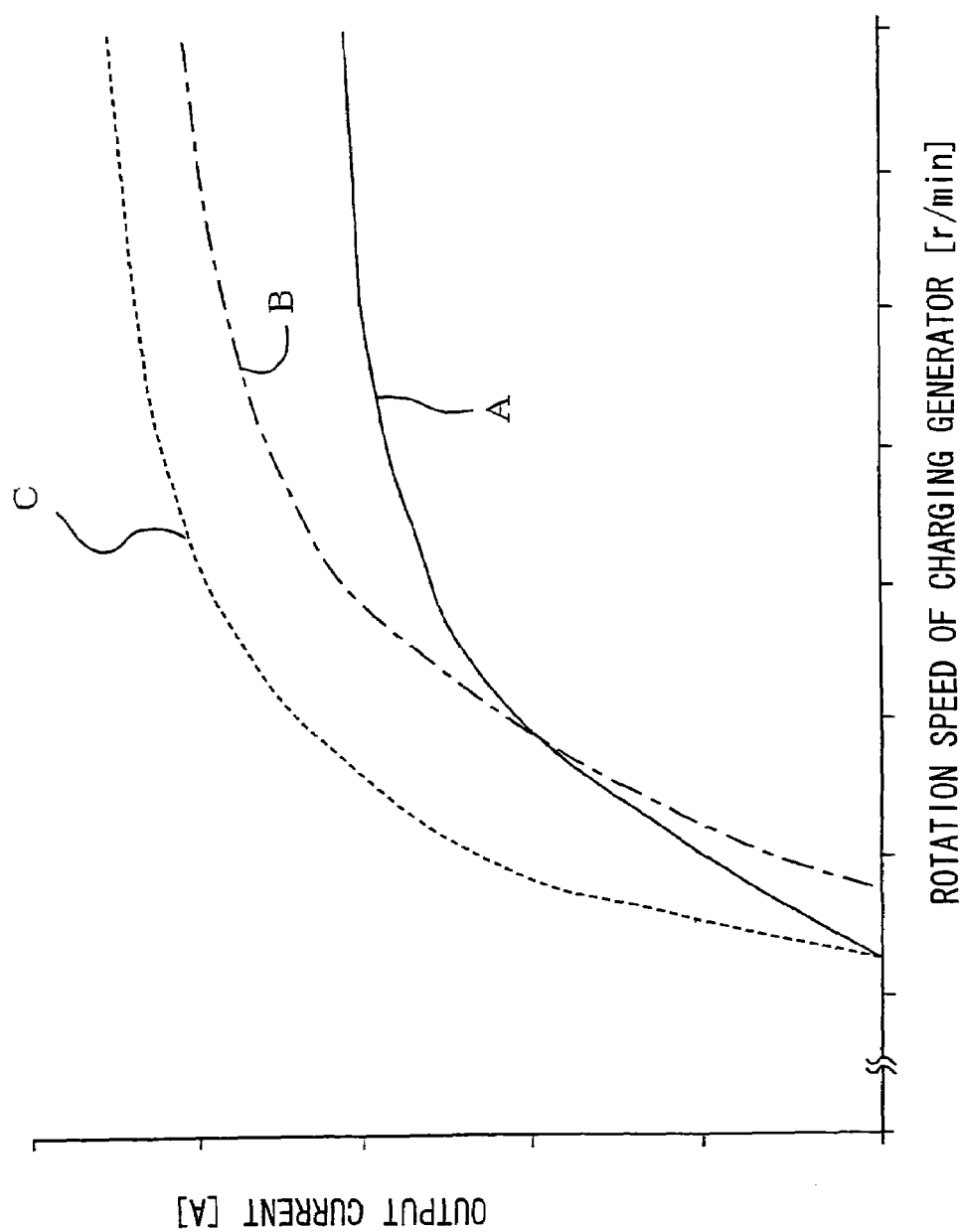
FIG. 7 is a characteristic diagram showing power generation output of the electric rotating machine functioning as a charging generator according to Embodiment 1 of the invention.

FIG. 7 is a characteristic diagram showing comparison of output power generation of a charging generator according to Embodiment 1 of the invention with that of the conventional charging generator. In the drawing, the abscissa axis indicates rotation speeds of the charging generators [r/min] and the vertical axis indicates output currents [A].

With reference to FIG. 7, a curve A (solid line) shows characteristics of the conventional charging generator of which type of armature winding is 3TY (star connection of three turns) and which has no magnet. A curve B (dotted dashed line) shows characteristics of the conventional charging generator of which armature winding is 4TΔ (delta connection of 4 turns) (=equivalent to star connection of 2.3 turn) and which has a magnet of small magnetizing force. A curve C (broken line) shows characteristics of a charging generator according to Embodiment 1 of the invention of armature windings is 4TΔ (delta connection of 4 turns) (=equivalent to star connection of 2.3 turn) and which has a magnet of large magnetizing force.

It is understood from FIG. 7 that the charging generator according to Embodiment 1 of the invention secures a rotation speed in rise of generation being the same or higher than that of conventional charging generator, and outputs power generation substantially larger than that of conventional devices over the area from low speed rotation to high speed rotation.

Embodiment 2

Figure 8A:
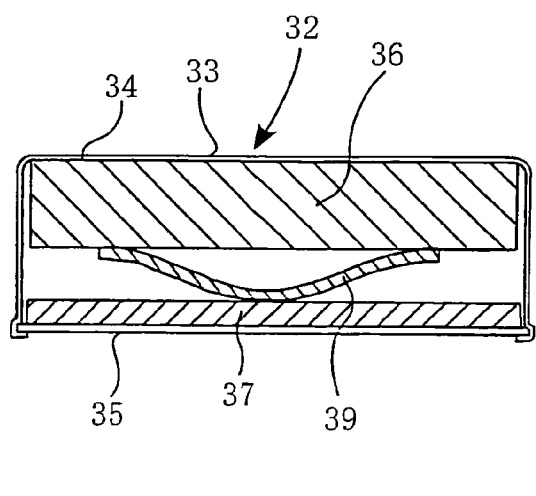
FIGS. 8A and 8B are cross sectional views of a magnetic short-circuit mechanism with which the rotor according to Embodiment 2 is provided, and respectively show a state that a magnetic plate is separated from a permanent magnet by spring force of a plate spring.
Figure 8B:
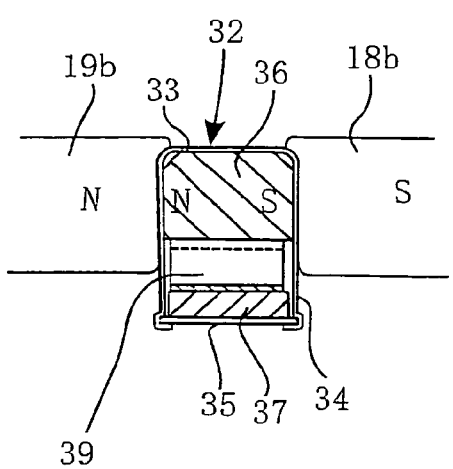
Figure 9A:
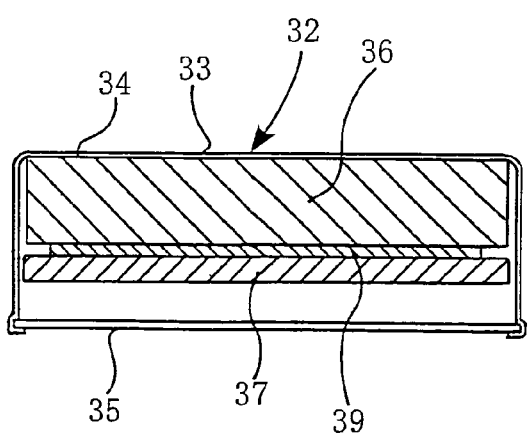
FIGS. 9A and 9B are cross sectional views showing a magnetic short-circuit mechanism according to Embodiment 2, and respectively show a state that the magnetic plate is pressed onto the inner circumferential face of the permanent magnet against the spring force of the plate spring.
Figure 9B:
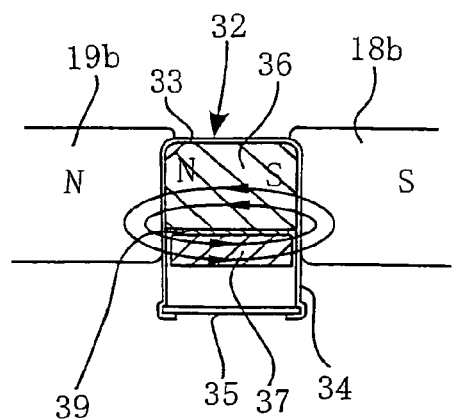

FIGS. 8 and 9 are cross sectional views respectively showing detailed structures of a magnetic short-circuit mechanism employed in an electric rotating machine according to Embodiment 2 of the invention. FIGS. 8A and 8B shows a state that a rotor rotates at low or medium speed and FIGS. 9A and 9B shows a state that the rotor rotates at high speed, respectively. In the drawings, the same reference numerals are designated to the same or like parts to those in Embodiment 1 shown in FIGS. 4 and 5.

While the coil springs 38 are used for returning the magnetic plate 37 to a magnetic short-circuit mechanism 32 in the foregoing Embodiment 1, a plate spring 39 is employed in this Embodiment 2 instead of the coil springs 38. The plate spring 39 in this example is preferably a nonmagnetic spring made of stainless steel or the like so as not to be effected by a magnetic flux generated by a permanent magnet 36.

Use of such plate spring 39 makes a structure easier than using the coil springs 38. Additionally, use of the plate spring 39 reduces a space in a case 33, thereby achieving a favorable cost.

The other features, functions and advantages are the same as those in the foregoing Embodiment 1, and a further detailed description is omitted herein.

Embodiment 3

Figure 10A:
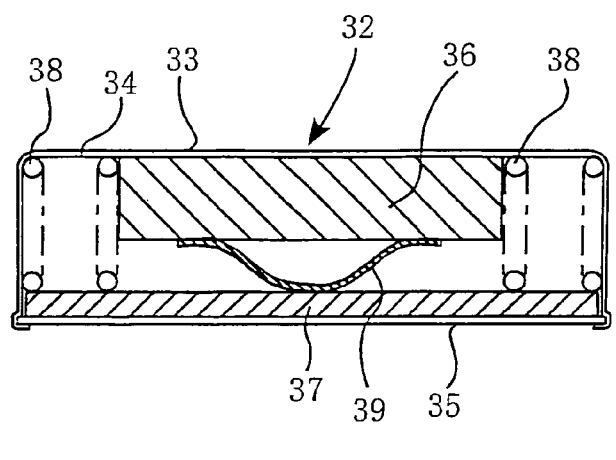
FIGS. 10A and 10B are cross sectional views of a magnetic short-circuit mechanism with which the rotor according to Embodiment 3 is provided, and respectively show a state that a magnetic plate is separated from a permanent magnet by spring force of a plate spring and a coil spring.
Figure 10B:
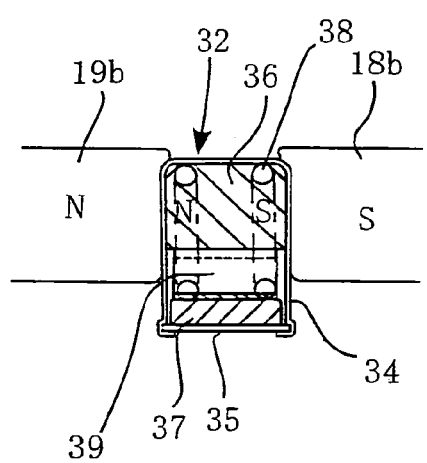
Figure 11A:
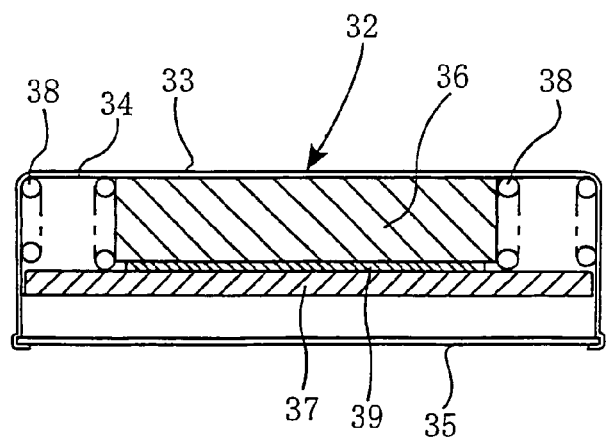
FIGS. 11A and 11B are cross sectional views showing a magnetic short-circuit mechanism according to Embodiment 3, and respectively show a state that the magnetic plate is pressed onto the inner circumferential face of the permanent magnet against the spring force of the plate spring and the coil spring.
Figure 11B:
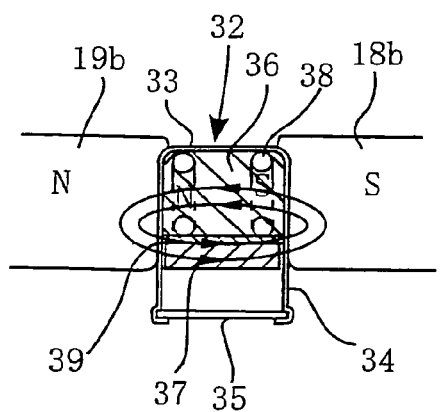

FIGS. 10 and 11 are cross sectional views showing in detail a magnetic short-circuit mechanism according to Embodiment 3. FIGS. 10A and 10B shows a state that a rotor rotates at low or medium speed and FIGS. 11A and 11B shows a state that the rotor rotates at high speed, respectively. In the drawings, the same reference numerals are designated to the same or like parts to those in Embodiment 1 shown in FIGS. 4 and 5.

In the magnetic short-circuit mechanism 32 according to Embodiment 1, the coil springs 38 are employed for returning the magnetic plate 37, and in Embodiment 2, the plate spring 39 is employed. On the other hand, in this Embodiment 3, both coil springs 38 and plate spring 39 are employed in combination.

In the case where the coil springs 38 and the plate spring 39 are employed in combination, it is possible to select a spring constant in combination. Accordingly, it becomes easy to optionally set a rotating speed N1 of the rotor when the magnetic plate 37 comes in contact with the permanent magnet 36, and a rotating speed N2 of the rotor when the magnetic plate 37 separates from the permanent magnet 36, eventually resulting in increase in free design.

The other features, functions and advantages are the same as those in the foregoing Embodiment 1, and a further detailed description is omitted herein.

Embodiment 4

Figure 12A:
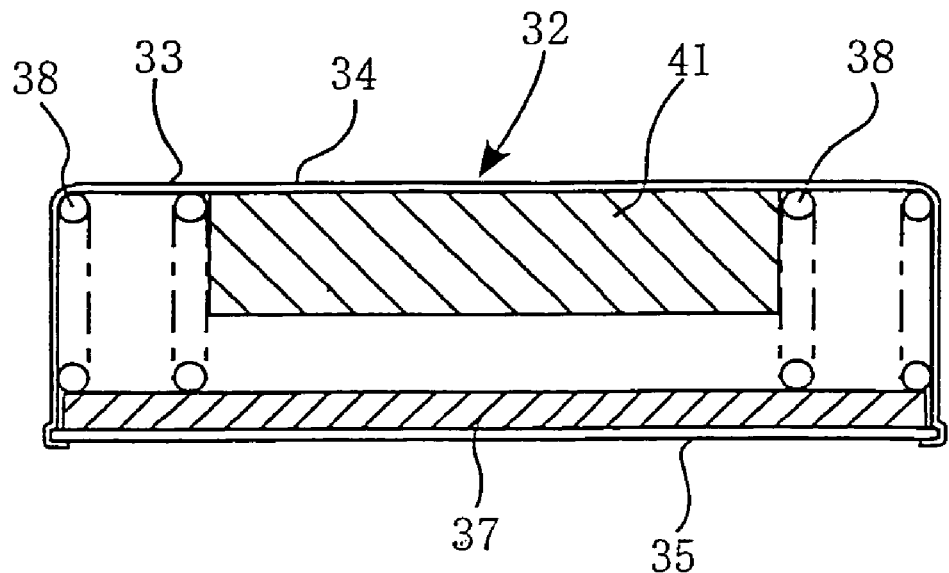
FIG. 12A and 12B are cross sectional views of a magnetic short-circuit mechanism according to Embodiment 4, and show a state that a magnetic plate is separated from a permanent magnet by spring force of a coil spring.
Figure 12B:
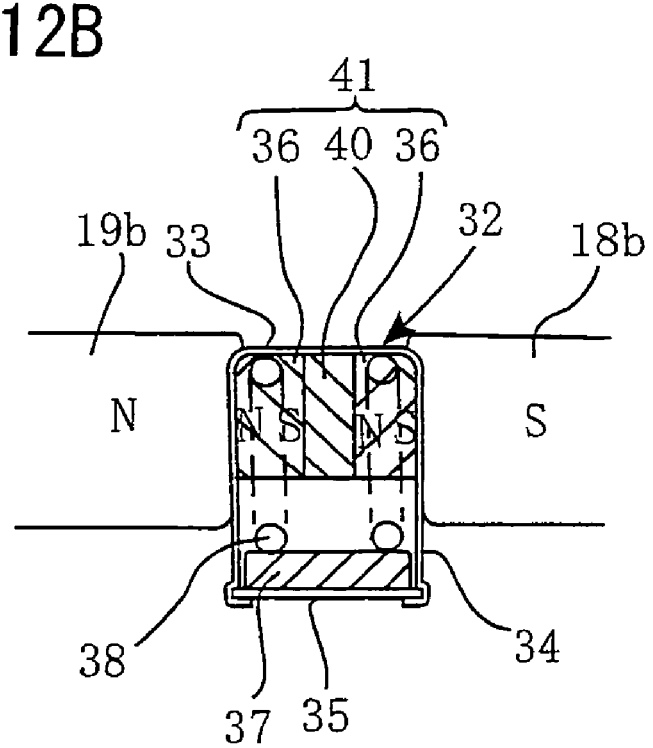

FIGS. 12A and 12B are cross sectional views showing in detail a magnetic short-circuit mechanism according to Embodiment 4, and in which the same reference numerals are designated to the same or like parts to those in Embodiment 1 shown in FIGS. 4 and 5.

In this Embodiment 4, the short-circuit mechanism 32 is provided with a permanent magnet unit 41 in which a magnetic metal plate 40 of high magnetic permeability composed of stainless steel plate or the like is integrally held between a pair of left and right permanent magnets 36 and fixed thereto. In this case, the left and right permanent magnets 36 are magnetized so that faces opposite to each other in the left and right permanent magnets 36 function as N-pole and S-pole respectively.

Further, the short-circuit mechanism 32 is constructed such that the mentioned permanent magnet unit 41, magnetic plate 37, and a pair of coil springs 38 functioning to bring the magnetic plate 37 in contact with and separate from the permanent magnet unit 41 by expansion and contraction, are accommodated in the case 33.

When interposing the magnetic metal plate 40 between the pair of permanent magnets 36 this manner, magnetic resistance becomes considerably smaller than the case where the permanent magnet 36, of which magnetic permeability is generally low, is simply used, and magnetic flux is increased, eventually resulting in improvement in power generation output characteristics.

The other features, functions and advantages are the same as those in the foregoing Embodiment 1, and a further detailed description is omitted herein. In addition, the arrangement of the permanent magnet unit 41 in which the magnetic metal plate 40 is interposed between the pair of permanent magnets 36 is not only applicable to this Embodiment 4 but also to the magnetic short-circuit mechanism 32 according to the foregoing Embodiment 1 to 3 in like manner.

Although the above description about Embodiments 1 to 4 is directed to a charging generator to which the present invention is applied, it is a matter of course that the invention is not limited to the charging generator but also is applicable to an electric rotating machine functioning as a charging generator and a starter generator. In such an electric rotating machine, not only the output characteristics for functioning as a charging generator but also torque characteristics for functioning as a starter generator are largely improved as compared with those of prior arts over the range from low rotation speed to high rotation speed.

Embodiment 5

Figure 13:
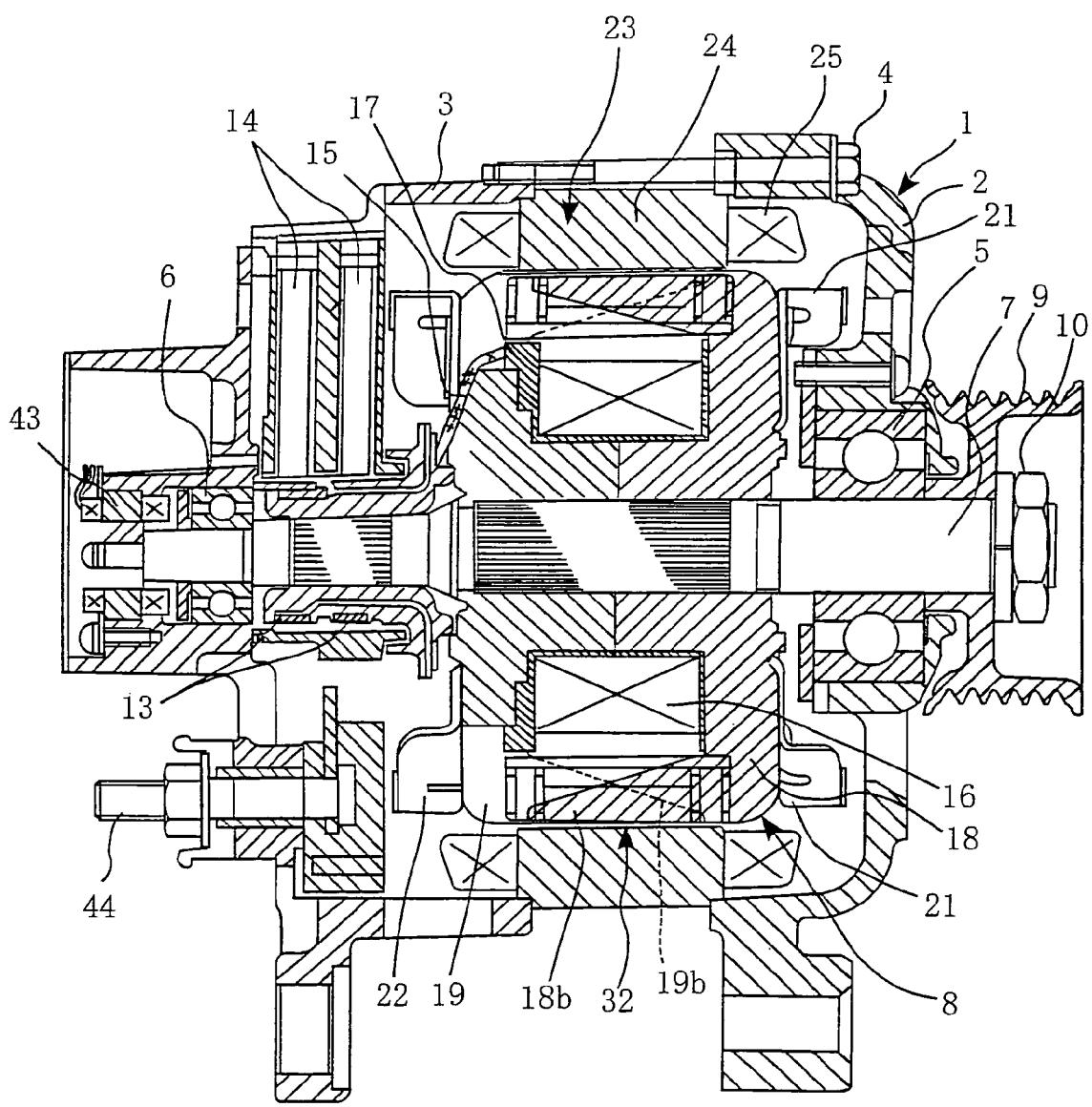
FIG. 13 is a cross sectional view showing a construction of an electric rotating machine functioning as a charging generator and starter generator according to Embodiment 5 of the invention.

FIG. 13 is a cross sectional view showing an electric rotating machine according to Embodiment 5, and in which the same reference numerals are designated to the same or like parts to those in Embodiment 1 shown in FIG. 1.

The electric rotating machine according to this Embodiment 5 functions not only as a charging generator but also as a starter generator. As compared with the charging generator according to the foregoing Embodiment 1, the electric rotating machine according to this Embodiment 5 is featured by some particular constituents, i.e., a rotational position detector 43 for detecting a rotational position of the rotor 8, and a three-phase terminal 44 electrically connected to the armature winding 25. The other features, functions and advantages are substantially the same as those in the foregoing Embodiment 1 including the magnetic short-circuit mechanism 32, and a further detailed description is omitted herein.

Figure 14:
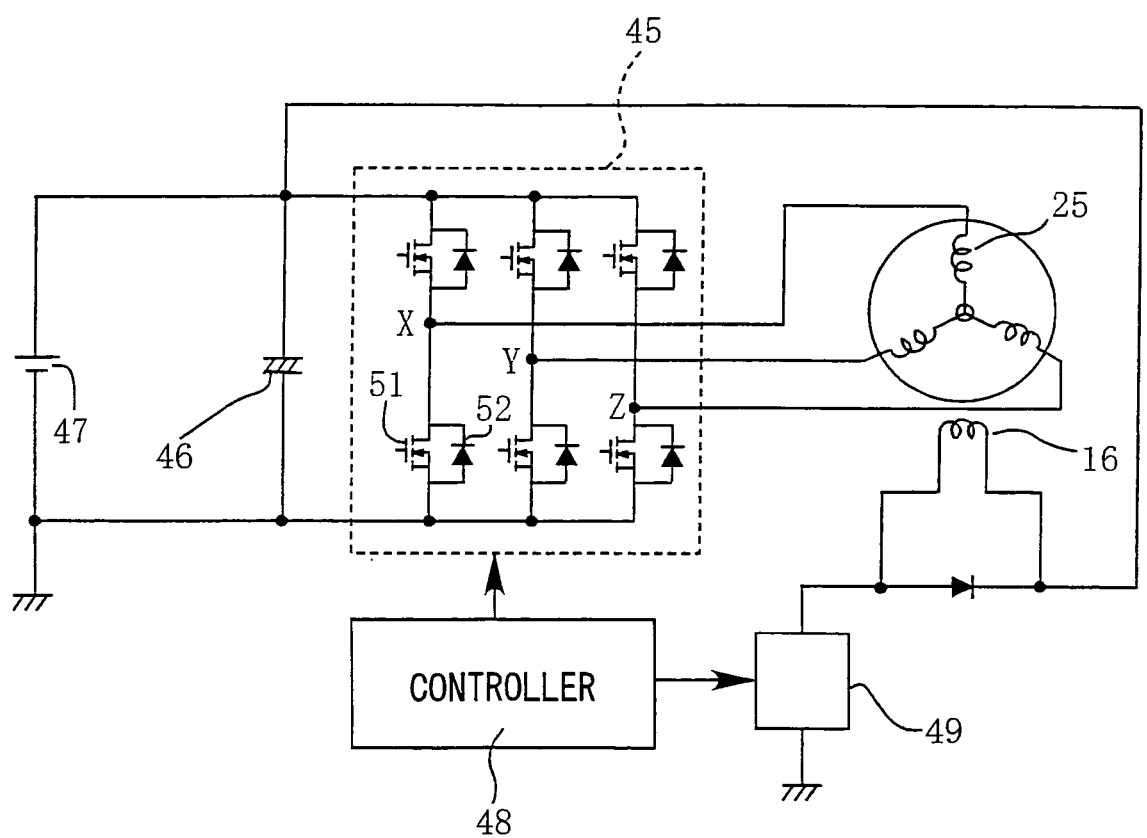
FIG. 14 is a circuit diagram showing an entire system of the electric rotating machine according to Embodiment 5.

FIG. 14 is a circuit diagram showing the entire system of the electric rotating machine functioning both as a charging generator and as a starter generator shown in FIG. 13.

In the drawing, the system includes an inverter unit 45, a smoothing capacitor 46, a battery 47, a controller 48, a field current control device 49, and an ECP (Engine Control Unit), not shown, for inputting necessary information to the controller 48. The inverter unit 45 is connected to the three-phase armature winding 25, and the inverter unit 45 is connected to the battery 47 via the smoothing capacitor 46. Further, the field current control device 49 is connected to the battery 47 via the field winding 16.

The inverter unit 45 is consisted of three connections in each of which two pairs of switching element 51 and a diode 52 connected in parallel are connected in series. Ends of Y-connection (star connection) of the armature winding 25 are respectively connected to intermediate connection points x, y and z of the serially-connected switching elements 51 via an AC winding, and the controller 48 controls switching operation of each switching element 51.

The field current control device 49 controls a field current flowing through the field winding 16 according to commands from the controller 48, and includes such elements as transistor. Additionally, when the mentioned electric rotating machine acts as a starter generator, the controller 48 makes on/off control of each switching element 51 of the inverter unit 45 to convert DC power from the battery 47 into a three-phase AC power, and supply the three-phase AC power to the armature winding 25 of the armature 23. When the mentioned electric rotating machine acts as a charging generator, the controller 48 is arranged to control the field current control device 49 depending on a value of an output voltage of the armature winding 25 to adjust a value of the field current flowing though the field winding 16, and to make on/off control of the each switching element 51 to invert three-phase AC power induced by the armature winding 25 into DC power thereby charging the battery 47.

Now, operation of the electric rotating machine of above construction is described. This electric rotating machine is used, for example, in idling stop system of hybrid cars. Thus the operation of the electric rotating machine is described taking an idling stop system as an example.

First, when the conditions for starting idling stop operation are satisfied, an engine, not shown, comes to stop. When the conditions for restarting the engine are satisfied, the buttery 47 begins to supply DC power to the inverter unit 45. Then, the controller 48 makes on/off control of each switching element 51 of the inverter unit 45 to convert the DC power to a three-phase AC power, thereby supplying the three-phase AC power to the armature winding 25 of the armature 23 via the three-phase terminal 44 and the AC winding.

On the other hand, a field current from the field current control device 49 is supplied to the field winding 16 of the rotor 8 via a brush 14, a slip ring 13 and a wire 15, to form a rotating magnetic field around the field winding 16 in advance. Accordingly, the rotor 8 comes to be driven by interaction between the magnetic field by the magnetic winding 16 and an induced current flowing through the armature winding 25 of the armature 23. Then, this rotating power of the rotor 8 is transmitted from a pulley 9 to the engine via a power transmission gear, not shown, thus the engine being started.

After the engine is started, the rotating power of the engine is transmitted to the rotor 8 via the power transmission gear, not illustrated, and the pulley 9, thereby the rotor 8 being driven comes to induce a three-phase AC voltage in the armature winding 25.

Then, the controller 48 makes on/off control of the each switching element 51 of the inverter unit 45 to convert the induced three-phase AC voltage in the armature winding 25 to a DC power, thereby the battery 47 being charged. Detailed description of the control operations and advantages performed as a charging generator is the same as those in the foregoing Embodiment 1, and is omitted herein.

Figure 15:
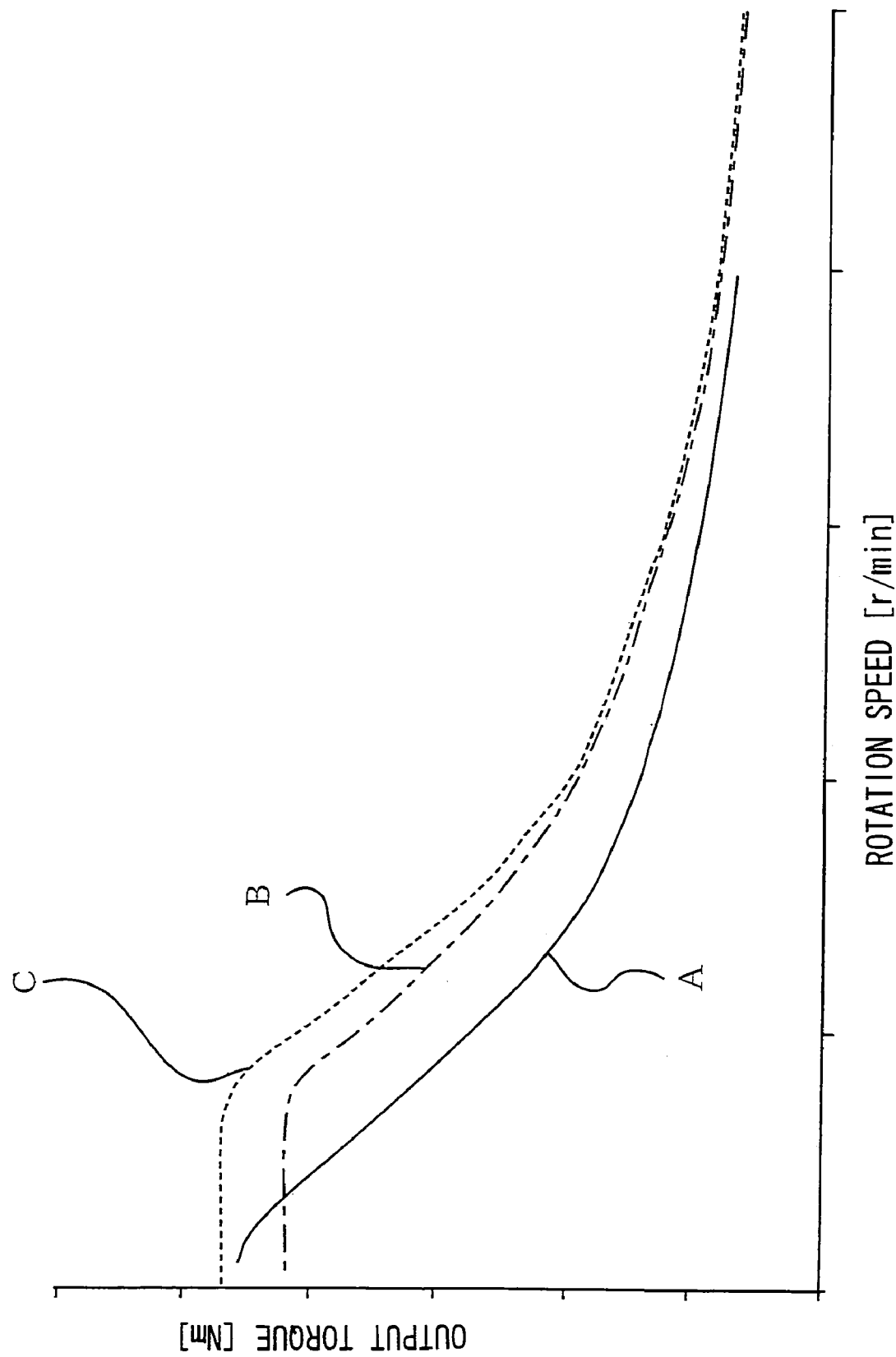
FIG. 15 is a diagram showing a torque characteristic of the electric rotating machine according to Embodiment 5 in comparison with that of the electric rotating machine according to the prior art.

FIG. 15 is a diagram showing torque characteristics of the electric rotating machine according to Embodiment 5 in comparison with that of the electric rotating machine according to the prior art. In the drawing, the axis of abscissas indicates rotation speed of the electric rotating machine [r/min] and the axis of ordinates indicates output torque [Nm].

In the drawing, a curve A (solid line) indicates characteristics of the conventional electric rotating machine of which type of armature winding 25 is 3TY (star connection of three turns) and which has no magnet. A curve B (broken line) indicates characteristics of the conventional rotating machine of which type of armature winding is 4T$\Delta$ (delta connection of 4 turns) (=equivalent to star connection of 2.3 turn) and which has a magnet of small magnetizing force. A curve C (broken line) shows characteristics of a electric rotating machine according to Embodiment 5 of this invention of armature windings is 4T$\Delta$ (delta connection of 4 turns) (=equivalent to star connection of 2.3 turn) and which has a magnet of large magnetizing force.

It is understood from FIG. 15 that the electric rotating machine according to Embodiment 5 of the invention generates larger torque at the same rotating speed, and keeps the generated torque over the high-speed rotation range.

Thus, in the electric rotating machine according to Embodiment 5 of the invention, in the case of operating the electric rotating machine as a charging generator by the application of the magnetic short-circuit mechanism 32, it is not necessary to carry out any field weakening for prevention of over-voltage at the time of small load and high speed rotation, thereby improving power generation output characteristic over the whole rotation speed range from low to high rotation speed. In the case of operating the electric rotating machine as a starter generator, it becomes possible to reduce allowable current capacity. And it is possible not only to start an engine smoothly by improving torque characteristic at the time of low speed rotation, but also to keep a higher speed rotation than in the prior art, thereby acceleration response being improved.

Embodiment 6

Figure 16:
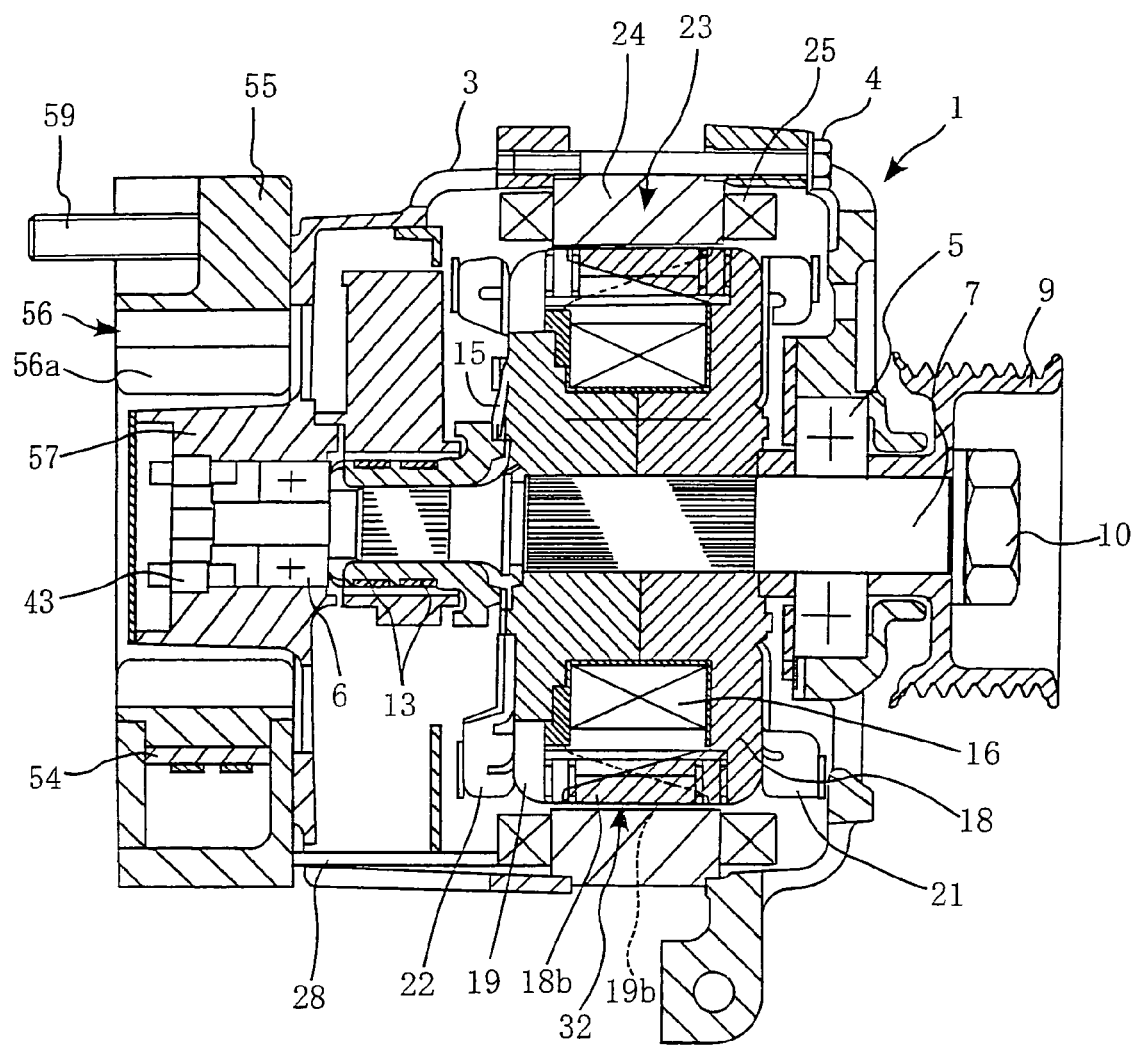
FIG. 16 is a cross sectional view showing a construction of an electric rotating machine functioning as a charging generator and starter generator according to Embodiment 6 of the invention.

FIG. 16 is a cross sectional view showing an electric rotating machine according to Embodiment 6 of the invention. In the drawing, the same reference numerals are designated to the same or like parts to those in Embodiment 5 shown in FIG. 13.

The electric rotating machine according to this Embodiment 6 functions not only as a charging generator but also as a starter generator. The inverter unit 45 and the smoothing capacitor 46 of the system shown in FIG. 14 are disposed separately in the foregoing Embodiment 5. On the other hand, a circuit part including an inverter unit 45 and a smoothing capacitor 46 is packaged and mounted on a circuit board 54, and the circuit board 54 is integrally mounted on an end face of a rear bracket 3 in this Embodiment 6.

That is, with reference to FIG. 16, a cylindrical heat sink 56 is integrally formed with an approximately cylindrical case 55 of insulating resin. The heat sink 56 is attached directly onto the end face of the rear bracket 3 in such a manner as to surround a bearing box 57 provided with a bearing 6 and a rotational position detector 43.

The heat sink 56, being composed of a metal with good heat conductance such as copper and aluminum, is formed into a C-shape viewed from a shaft direction and. Fins 56*a* extending in the shaft direction is erected on the inner circumference of the heat sink 56 at circumferentially equiangular pitch. Further, the circuit board 54 is disposed on the outer circumference of the heat sink 56 to be electrically insulated, and accommodated in the case 55. And switching elements 51 and diodes 52 consisting the mentioned inverter unit 45, and the smoothing capacitor 46 are mounted on the circuit board 54, thus forming the circuit shown in FIG. 14.

Three-phase wires 28 extending from ends of the Y-connection of an armature winding 25 are electrically connected to the inverter unit 45. As a result, the three-phase terminal 44 connected to the armature winding 25 in the foregoing Embodiment 5 can be eliminated. Instead, a power terminal 59 for making connection to a battery 47 is provided.

The other features, functions and advantages including a magnetic short-circuit mechanism 32 are the same as those in the foregoing Embodiment 5, and a further detailed description is omitted herein.

As described above, in the electric rotating machine according to this Embodiment 6, there is an advantage such that it is not necessary to carry out any field weakening for preventing over-voltage at the time of small load and high-speed rotation, thereby making it possible to reduce allowable current capacity, in addition to the advantages described in the foregoing Embodiment 5. Consequently, installation and connection of the inverter unit 45, etc. can be achieved in a compact manner, eventually resulting in downsizing and cost reduction of the electric rotating machine.

Additionally, although the inverter unit 45 and smoothing circuit 46 are packaged on the circuit board 54 and integrally mounted on the end face of the rear bracket 3 in this Embodiment 6, it is preferable that the controller 48 and field current control device 49 of the system shown in FIG. 14 are also integrally mounted on the end face of the rear bracket 3.

INDUSTRIAL APPLICABILITY

The present invention is not limited to the foregoing Embodiments 1 to 6, and various variations and modifications may be made without departing from the spirit and scope of the invention that magnetic flux from the permanent magnet 36 is reduced by means of short-circuit between N-pole and S-pole of the permanent magnet 36. Furthermore, the invention is not restricted to the charging generator and starter generator but is applicable to any other electric rotating machine including other type of motor, generator, generator-motor.

What is claimed is:

1. An electric rotating machine including an armature formed by winding an armature winding on an armature core, and a rotor rotatably supported on the inner diameter side of said armature with a predetermined space; said rotor including a rotor core comprising a cylindrical part on the other periphery of which a field winding is wound, and a claw-pole shaped magnetic pole part that is magnetized so that magnetic claw poles adjacent each other in circumferential direction are different in polarity; and a permanent magnet for supplying magnetic flux to said armature core in cooperation with said field winding is disposed in said claw-pole shaped magnetic pole part, wherein a magnetic short-circuit mechanism is disposed between the magnetic claw poles adjacent each other in circumferential direction of said rotor core; and said magnetic short-circuit mechanism causes a magnetic plate composed of a material of high magnetic permeability to move toward radial direction of said rotor core so as to short circuit between N-pole and S-pole of said permanent magnet due to centrifugal force acting in accordance with rotation of said rotor, and wherein said magnetic short-circuit mechanism has a non-magnetic case in which said permanent magnet, said magnetic plate, and a coil spring expanding and contracting so that the magnetic plate comes in contact with or separates from the permanent magnet, are accommodated.

2. An electric rotating machine including an armature formed by winding an armature winding on an armature core, and a rotor rotatably supported on the inner diameter side of said armature with a predetermined space; said rotor including a rotor core comprising a cylindrical part of the outer periphery of which a field winding is wound, and a claw-pole shaped magnetic pole part that is magnetized so that magnetic claw poles adjacent each other in circumferential direction are different in polarity; and a permanent magnet for supplying magnetic flux to said armature core in cooperation with said field winding is disposed in said claw-pole shaped magnetic pole part, wherein a magnetic short-circuit mechanism is disposed between the magnetic claw poles adjacent each other in circumferential direction of said rotor core; and said magnetic short-circuit mechanism causes a magnetic plate composed of a material of high magnetic permeability to move toward radial direction of said rotor core so as to short circuit between N-pole and S-pole of said permanent magnet due to centrifugal force acting in accordance with rotation of said rotor, and wherein said magnetic short-circuit mechanism has a non-magnetic case in which a permanent magnet unit consisting of a pair of permanent magnets between which a magnetic metal plate of high magnetic permeability is fixedly held, said magnetic plate, and a coil spring expanding and contracting so that the magnetic plate comes in contact with or separates from the permanent magnet unit, are accommodated.

3. The electric rotating machine according to claim 1, wherein said coil spring is composed of either a coil-type spring member or a plate-like spring member.

4. The electric rotating machine according to claim 2, wherein said coil spring is composed of at least either a coil-type spring member or a plate-like spring member.

5. The electric rotating machine according to claim 1, wherein said case is constructed so that internal part thereof is liquid-tight.

6. The electric rotating machine according to claim 2, wherein said case is constructed so that internal part thereof is liquid-tight.

7. The electric rotating machine according to claim 1, wherein a spring constant of said spring members is set so that said magnetic plate is pressed onto the permanent magnet side by acceleration of said rotor core to a predetermined rotating speed N1 and that said magnetic plate is separated from the permanent magnet by reduction of said rotor core to a predetermined rotating speed N2.

8. The electric rotating machine according to claim 2, wherein a spring constant of said spring members is set so that said magnetic plate is pressed onto the permanent magnet side by acceleration of said rotor core to a predetermined rotating speed N1 and that said magnetic plate is separated from the permanent magnet by reduction of said rotor core to a predetermined rotating speed N2.

9. The electric rotating machine according to claim 2, which is formed into a charging generator consisting of voltage control means for controlling output voltage by controlling field current flowing through said field winding in accordance with a value of the output voltage of said armature winding.

10. The electric rotating machine according to claim 2, which is formed into a charging generator and starter generator consisting of an inverter unit for converting electric power of a battery, a field current control device for controlling current flowing through said field winding, and control means for controlling said inverter unit and said field current control device.

11. The electric rotating machine according to claim 10, wherein at least said inverter unit is mounted on an end face or a circumferential face of the case covering said armature and said rotor.

* * * * *